(12) United States Patent
Erikstrup

(10) Patent No.: US 10,693,152 B2
(45) Date of Patent: Jun. 23, 2020

(54) FUEL CELL STACK WITH THIN ENDPLATE WITH INTEGRATED GAS DISTRIBUTION TUBES

(75) Inventor: Niels Erikstrup, Frederiksberg C (DK)

(73) Assignee: Haldor Topsoe A/S, Lyngby (DK)

(*) Notice: Subject to any disclaimer, the term of this patent is extended or adjusted under 35 U.S.C. 154(b) by 458 days.

(21) Appl. No.: 14/238,223

(22) PCT Filed: Sep. 7, 2011

(86) PCT No.: PCT/EP2011/004496
§ 371 (c)(1),
(2), (4) Date: Feb. 11, 2014

(87) PCT Pub. No.: WO2013/034163
PCT Pub. Date: Mar. 14, 2013

(65) Prior Publication Data
US 2014/0212783 A1    Jul. 31, 2014

(51) Int. Cl.
*H01M 8/0247* (2016.01)
*H01M 8/0208* (2016.01)
*H01M 8/021* (2016.01)
*H01M 8/124* (2016.01)

(52) U.S. Cl.
CPC ......... *H01M 8/0247* (2013.01); *H01M 8/021* (2013.01); *H01M 8/0208* (2013.01); *H01M 2008/1293* (2013.01)

(58) Field of Classification Search
CPC .. H01M 8/2465; H01M 8/0208; H01M 8/021; H01M 8/0247; H01M 8/2485; H01M 8/0258; H01M 8/04529; H01M 8/04029; H01M 8/04067; H01M 8/04201; H01M 8/04753; H01M 8/241; H01M 8/1039; H01M 8/1004; H01M 8/04679; H01M 8/04089; H01M 8/0263; H01M 8/2483; H01M 8/2457; H01M 8/0267; H01M 2008/1293
See application file for complete search history.

(56) References Cited

U.S. PATENT DOCUMENTS

| 6,291,089 B1 | 9/2001 | Piascik et al. |
| 6,589,681 B1* | 7/2003 | Yamanis ............. H01M 8/0247 429/454 |
| 2006/0286432 A1 | 12/2006 | Rakowski et al. |

(Continued)

FOREIGN PATENT DOCUMENTS

| WO | WO 2008/023879 A1 | 2/2008 | |
| WO | WO2011/116794 | * 3/2010 | ............. H01M 8/02 |

*Primary Examiner* — Stephen J Yanchuk
(74) *Attorney, Agent, or Firm* — Blank Rome LLP

(57) ABSTRACT

A fuel cell stack comprises a thin process-gas-connection-endplate with a temperature expansion coefficient which is substantially the same as the temperature expansion coefficient of the plurality of fuel cells and interconnects forming the fuel cell stack, the length and width of the thin process-gas-connection-endplate is matching the length and width of the fuel cells and interconnects and the process-gas-connection-endplate is sealed to the stack of cells and interconnects so the process-gas-connection-endplate, cells and interconnects form one integrated unit, wherein process gas distribution tubes are fixed connected, e.g. welded or brazed to the process-gas-connection-endplate.

10 Claims, 2 Drawing Sheets

(56) References Cited

U.S. PATENT DOCUMENTS

| | | | |
|---|---|---|---|
| 2009/0001722 A1* | 1/2009 | Yoshihiro | F16L 37/23 |
| | | | 285/382.2 |
| 2009/0169930 A1* | 7/2009 | Oh | H01M 8/0258 |
| | | | 429/479 |
| 2010/0040934 A1* | 2/2010 | Perry | F16L 51/00 |
| | | | 429/454 |
| 2010/0190090 A1* | 7/2010 | Kuno | H01M 8/2425 |
| | | | 429/495 |
| 2010/0233565 A1* | 9/2010 | Gottmann | H01M 8/0252 |
| | | | 429/458 |
| 2011/0008701 A1* | 1/2011 | Akagi | H01M 8/243 |
| | | | 429/455 |
| 2011/0143261 A1* | 6/2011 | Brandner | B22F 3/02 |
| | | | 429/507 |
| 2011/0171556 A1* | 7/2011 | Sugawara | H01M 8/04029 |
| | | | 429/459 |

* cited by examiner

FUEL CELL STACK WITH THIN ENDPLATE WITH INTEGRATED GAS DISTRIBUTION TUBES

FIELD OF THE INVENTION

The invention relates to a fuel cell stack with at least one process-gas-connection-endplate, which is thin, has a length and a width and a thermo expansion coefficient which matches the length and width and the thermo expansion coefficient of the fuel cell stack and which comprises at least one process gas distribution tube.

BACKGROUND OF THE INVENTION

In the following, the invention will be explained in relation to a Solid Oxide Fuel Cell. The interconnect according to the invention can, however, also be used for other types of fuel cells such as Polymer Electrolyte Fuel cells (PEM) or a Direct Methanol Fuel Cell (DMFC). A Solid Oxide Fuel Cell (SOFC) comprises a solid electrolyte that enables the conduction of oxygen ions, a cathode where oxygen is reduced to oxygen ions and an anode where hydrogen is oxidised. The overall reaction in a SOFC is that hydrogen and oxygen electrochemically react to produce electricity, heat and water. In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

$$CH_4 + H_2O \rightarrow CO + 3H_2$$

$$CH_4 + CO_2 \rightarrow 2CO + 2H_2$$

$$CO + H_2O \rightarrow CO_2 + H_2$$

During operation, an oxidant such as air is supplied to the solid oxide fuel cell in the cathode region. Fuel such as hydrogen is supplied in the anode region of the fuel cell. Alternatively, a hydrocarbon fuel such as methane is supplied in the anode region, where it is converted to hydrogen and carbon oxides by the above reactions. Hydrogen passes through the porous anode and reacts at the anode/electrolyte interface with oxygen ions generated on the cathode side that have diffused through the electrolyte. Oxygen ions are created in the cathode side with an input of electrons from the external electrical circuit of the cell.

To increase voltage, several cell units are assembled to form a stack and are linked together by interconnects. Interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell which requires electrons for the reduction process. Further, interconnects are normally provided with a plurality of flow paths for the passage of fuel gas on one side of the interconnect and oxidant gas on the opposite side.

A solid oxide fuel cell (SOFC) stack is thus a sandwich composed of ceramic fuel cells and metal interconnects and spacers. These different materials are glued together at high temperature with glass seals to form a rigid structure. The use of such different materials makes it impossible to avoid some differences in thermal expansion coefficients (TEC). During operation, the stack can be subjected to high temperatures up to approximately 1000 degrees Celsius causing temperature gradients in the stack and thus different thermal expansion of the different components of the stack. The resulting thermal expansion may lead to a reduction in the electrical contact between the different layers in the stack. The thermal expansion may also lead to cracks and leakage in the gas seals between the different layers leading to poorer functioning of the stack and a reduced power output.

When the stack is cooled from the sealing temperature or the operation temperature, the mismatch in TEC values results in thermomechanic stresses and crack inducing energy. The potential energy which can be released when the endplate and the stack delaminates is approximately proportional to the thickness of the endplate and proportional to the square of the difference between the stack TEC and the endplate TEC. Hence, both the match of TEC values and the thickness of the endplates are crucial for the integrity of the cell stack. With thick endplates integral with the stack ends, the crack inducing energy will result in delamination of the stack and loss of integrity unless the stack is protected by a compression system.

A solution to this problem is disclosed in PCT/EP201/001938, where the thickness and the TEC values of the endplates are sought matched to the cell stack. However, thin endplates only partly solves the problems: the mismatch in TEC values will be a problem even with thin endplates if further components with different TEC values are applied to the cell stack. This is the case in state of the art cell stacks where the connection of process gas to the cell stack is done by means of thick metal plates. Therefore, there is a need for a process gas connection solution to fuel cell stacks, which solves the problem of TEC values of process gas connections, which do not match the cell stack TEC values.

EP0408104 discloses process gas supplies, which are connected to thin separator plates. However, the separator plates extend outside the area of the actual cell stack, therefore need a considerable extra amount of space, and excessively increases the total dimensions of the cell stack arrangement (FIG. 3). Further EP0408104 describes a spring loaded gas passage from the process gas supply to each cell in the stack to compensate for the shrinkage of the electrodes, a rather expensive solution as a cell stack comprises a large amount of cells.

WO02075893 also discloses a solution where process gas supplies are arranged outside the active area of the cell stack and at least some of the gas supplies are connected to rather thick plates.

A similar solution can be found in WO2008023879, where process gas supplies are connected to relative thick endplates.

SUMMARY OF THE INVENTION

It is an object of the invention to provide a fuel cell stack comprising a process gas connection solution, which minimizes crack inducing energy within the cell stack.

It is a further object of the invention to provide a fuel cell stack comprising a process gas connection solution, which is compact and cost reducing as compared to known solutions.

It is a further object of the invention to provide a process gas connection, which contributes to a high electrical efficiency of a fuel cell stack.

It is yet a further object of the invention to provide a process gas connection, which saves material and lowers the thermal mass of the fuel cell stack.

An object of the invention is further to reduce the dimensions, the production time and fail rate of the process gas connection and the cell stack.

It is another object of the invention to provide a process gas connection, which reduces the number of components in a fuel cell stack and the sealing numbers and surface areas.

These and other objects are achieved by the invention as described below.

Accordingly, a process-gas-connection-endplate is provided for especially solid oxide fuel cell stacks, but also potentially to other fuel cell stacks such as PEM and DMFC. In any case, the fuel cell stack comprises a plurality of stacked fuel cells, each of which comprises at least an anode, an electrolyte and a cathode. Neighbouring fuel cells are divided by an interconnect. The stack further comprises at least one process-gas-connection-endplate with a length and a width, which corresponds to the length, and width of the plurality of fuel cells. It is to be understood that the fuel cell stack including the process-gas-connection-endplate(s) thus has a regular substantially box-shaped (e.g. corners can be rounded or chamfered) form which is both space saving and easy to build into arrangements and easy to thermally insulate.

The material and the thickness of the process-gas-connection-endplate are adapted to provide a TEC-value of the process-gas-connection-endplate, which substantially matches the temperature expansion coefficient of the plurality of cells. It is to be understood that "substantially" means that the TEC-value of the process-gas-connection-endplate is not necessarily exactly the same numerical value as the TEC-value of the plurality of fuel cells, rather it is circa the same. How equal the TEC-value of the process-gas-connection-endplate is with the TEC-value of the fuel cells can be a design-compromise of several factors, but important is to understand that the thickness of the process-gas-connection-endplate is far from the known art thick endplates which can be 8-10 mm (or even thicker) which and therefore have a large thermal mass relative to the fuel cells and the potential for a large crack inducing energy.

The at least one process-gas-connection-endplate and the plurality of fuel cells are connected to each other by seals so they form a single integrated unit after assembly and as mentioned before a regular substantially box-shaped unit, easy to handle and arrange in systems or modules. However, some connections are necessary to the fuel cell stack, and therefore the box-shape does have some added features:

The process-gas-connection-endplate has at least one process gas distribution tube, which is permanently fixed connected to a first face of the process-gas-connection-endplate. It is to be understood that the fixed connection of the tube to the process-gas-connection-endplate means that the process-gas-connection-endplate and the at least one process gas distribution tube forms an integrated unit. Thus, no seals are necessary between the end plate and the at least one process gas tube. As the seals are points of potential failure, this is an important feature of the invention.

In an embodiment of the described invention, there is specifically two-process gas distribution tubes fixed connected to the process-gas-connection-endplate: a first process gas distribution tube, inlet and a second process gas distribution tube, outlet. These two process gas distribution tubes can be adapted to distribute anode gas or cathode gas to and from the plurality of stacked fuel cells. This embodiment of the invention can be adapted for fuel cell stacks, which has both internal and external process gas manifolding. I.e. the mentioned two process gas distribution tubes are adapted to provide process gas on the internal manifolding side of the fuel cells, while the external manifolds provide process gas to the external manifolding side of the fuel cells. By internal manifolding is meant that the process gas distribution from an gas inlet or outlet to or from each of the fuel cells in the fuel cell stack is provided by a manifold which is located physically within/integrated in the substantially box shaped fuel cell stack, whereas external manifolding means that the process gas distribution from an gas inlet or outlet to or from each of the fuel cells in the fuel cell stack is provided by a manifold which is located physically outside, adjacent to the substantially box shaped fuel cell stack.

In a further embodiment of the invention, the process-gas-connection-endplate is provided with only one process gas distribution tube, an anode gas distribution tube, and inlet. There is no outlet tube for the anode gas. Instead the anode gas is mixed with the cathode gas when the gases are exhausted from the fuel cells, and when the partially reacted anode gas and cathode gas is mixed, the anode gas is combusted.

In a further embodiment of the invention, the at least one process gas distribution tube comprises a flexible member which is adapted to compensate for vibrations or movements of the members attached to the tube relative to the fuel cell stack. The fuel cell stack does not generate vibrations as it has no moving parts, but the changing temperatures of the fuel cell stack can generate movements. The surrounding equipment and the surroundings as such can also be the cause of vibrations and movements. As vibrations and movements can cause leaks or damage to the fuel cell stack, it is important to compensate for these challenges. The flexible member can be of any kind in known art, which has the required flexibility as well as the ability to endure the process environment. For instance, the flexible member can be a bellows.

In a further embodiment of the invention, the second face of the process-gas-connection-endplate (opposite the first face of the process-gas-connection-endplate) comprises flow paths integrated into the process-gas-connection-endplate. The flow paths are adapted to distribute a process gas from the first process gas distribution tube, inlet, and evenly past the active area of a first of said plurality of fuel cells, and to the second process gas distribution tube, outlet. In this embodiment of the invention, the flow paths of the process-gas-connection-endplate may correspond to the flow paths of the interconnects in the fuel cell stack.

In an embodiment of the invention, the process-gas-connection-endplate is made of metal and the at least one process gas distribution tube is welded to the process-gas-connection-endplate. The metal may be a chrome steel or a nickel alloy. This may also be the metal chosen for the interconnects in the fuel cell stack, whereby the TEC-value of the process-gas-connection-endplate can be very close to the TEC-value of the interconnects.

In an embodiment of the invention, the thickness of the process-gas-connection-endplate is in the range of 0.2-2.0 mm, preferably in the range of 0.4-1.2 mm. This thickness may be matched with the thickness of the inter-connects. As mentioned earlier, the length and the width of the process-gas-connection-endplate is substantially the same as the length and the width of the fuel cells. It may in an embodiment of the invention be in the range of 40-300 mm, preferably within the range of 100-200 mm.

Accordingly, when compared to state of the art process gas connections, the main advantages of the invention are:
Leaks and faults due to uneven and non-flexible heat expansion of the cell stack are reduced.

Material cost of the process gas connection is reduced,
Fuel cell stack assembling time is reduced.
Fuel cell mal-function due to mal-assemblage is prevented.
Number of components is reduced.
Start-up time is reduced due to low mass and the flexible geometry that allows higher thermal gradients without harming cells or seals.

FEATURES OF THE INVENTION

1. A fuel cell stack (100) comprising a plurality of stacked fuel cells (101), each cell comprising at least an anode (102), an electrolyte (103) and a cathode (104) and neighbouring fuel cells are divided each by an interconnect (105), said stack further comprises at least one process-gas-connection-endplate (106) with length and width corresponding to the length and width of said plurality of cells, the material and thickness of said process-gas-connection-endplate are adapted to provide said process-gas-connection-endplate with a temperature expansion coefficient substantially matching the temperature expansion coefficient of said plurality of cells; said at least one process-gas-connection-endplate and said plurality of fuel cells are connected to each other by seals to form a single integrated unit, wherein said process-gas-connection-endplate comprises at least one process gas distribution tube (107) which is fixed connected to a first face of the process-gas-connection-endplate, whereby the process-gas-connection-endplate and said at least one process gas distribution tube forms an integrated unit and no seals are necessary between the process-gas-connection-endplate and the at least one process gas distribution tube.

2. A fuel cell stack according to feature 1, wherein said process-gas-connection-endplate is provided with two process gas distribution tubes: a first process gas distribution tube, inlet (108) and a second process gas distribution tube, outlet (109) for distribution of anode gas or cathode gas to and from the plurality of stacked fuel cells.

3. A fuel cell stack according to feature 1, wherein said process-gas-connection-endplate is provided with one process gas distribution tube: a anode gas distribution tube, inlet (108) and wherein the anode gas is distributed from said anode gas distribution tube, inlet, evenly past an active area of said plurality of fuel cells, and thereafter exhausted, mixed with the cathode outlet gas and combusted.

4. A fuel cell stack according to any of the preceding features, wherein said at least one process gas distribution tube comprises a flexible member (110) adapted to compensate for vibrations and movements.

5. A fuel cell stack according to feature 4, wherein said flexible member is a bellows.

6. A fuel cell stack according to any of the preceding features, wherein said process-gas-connection-endplate comprises process gas flow paths integrated in a second face opposite the first face of the process-gas-connection-endplate, said process gas flow paths are adapted to distribute a process gas from the first process gas distribution tube, inlet, evenly past an active area of a first of said plurality of fuel cells, and to the second process gas distribution tube, outlet.

7. A fuel cell stack according to any of the preceding features, wherein said process-gas-connection-endplate is made of metal and said at least one process gas distribution tube is welded or brazed to the process-gas-connection-endplate.

8. A fuel cell stack according to feature 7, wherein said metal is a chrome steel or a nickel alloy.

9. A fuel cell stack according to any of the preceding features, wherein the thickness of said process-gas-connection-endplate is in the range 0.2-2.0 mm, preferably in the range 0.4-1.2 mm.

10. A fuel cell stack according to any of the preceding features, wherein the length and width of said process-gas-connection-endplate and said plurality of fuel cells are within the range of 40-300 mm, preferably within the range of 80-200 mm.

11. A fuel cell stack according to any of the preceding features, wherein the plurality of fuel cells are Solid Oxide Fuel Cells.

DESCRIPTION OF THE DRAWINGS

The invention is further illustrated by the accompanying drawing, which shows an example of some embodiments of the invention.

POSITION NUMBER OVERVIEW

Figure 1:
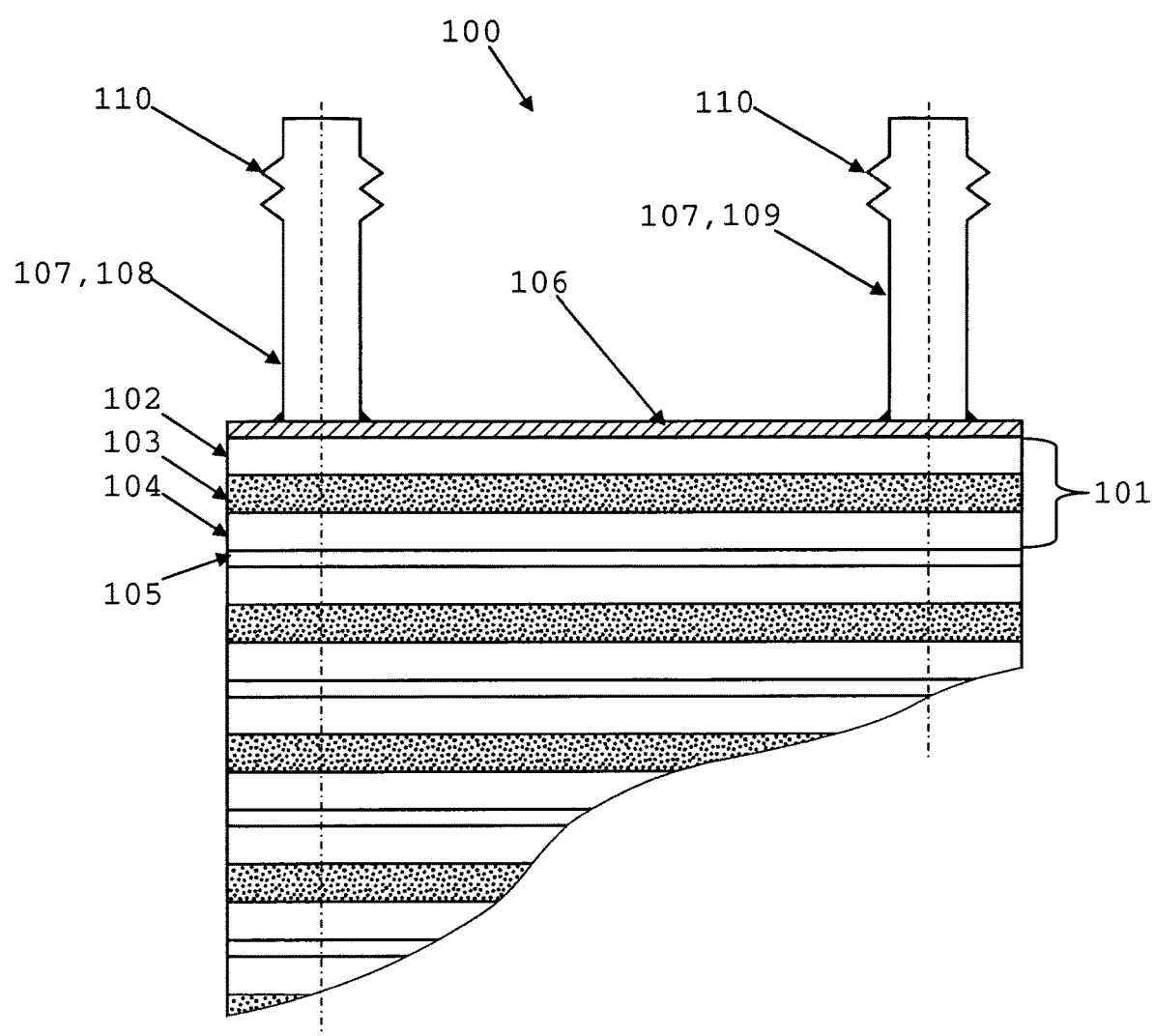
FIG. 1 shows a cut side view of a fuel cell stack comprising a process-gas-connection-endplate according to an embodiment of the invention.

100. Fuel cell stack
101. Fuel cell
102. Anode
103. Electrolyte
104. Cathode
105. Interconnect
106. Process-gas-connection-endplate
107. Process gas distribution tube
108. First process gas distribution tube, inlet
109. Second process gas distribution tube, outlet
110. Flexible member FIG. 1 shows a fuel cell stack 100, which is made of a plurality of fuel cells 101, stacked each on top of another to form a whole stack.

Each of the cells comprises at least an anode 102, an electrolyte 103 and a cathode 104. And between each fuel cell in the stack is placed an interconnect 105 which serves to divide the anode gas from the cathode gas, the interconnects serve to provide anode gas and cathode gas flow evenly past the area of the anodes and the cathodes by means of flow paths (not shown) on each face of the interconnects and they serve to conduct current from one fuel cell in the stack to the next.

The fuel cell stack is provided with at least one thin endplate, a process-gas-distribution-endplate 106 according to the invention. As can be partly seen on FIG. 1, the dimensions of the process-gas-distribution-endplate are matching the dimensions of the fuel cell stack and the thickness of the interconnects as an important feature of this embodiment of the invention.

Another important feature of the invention is that the process-gas-distribution-endplate is provided with at least one process gas distribution tube 107. By means of this tube, process gas can be distributed to or from the fuel cell stack. In the embodiment according to FIG. 1, the process-gas-distribution-endplate is provided with two process gas distribution tubes, a first process gas distribution tube, inlet 108, which provides flow to the fuel cells of the stack, and a second process gas distribution tube, outlet 109, which provides flow from the fuel cells.

To compensate for vibrations and movements of the connected process gas equipment relative to the fuel cell stack, each process gas distribution tube can be provided with a flexible member 110.

Figure 2:
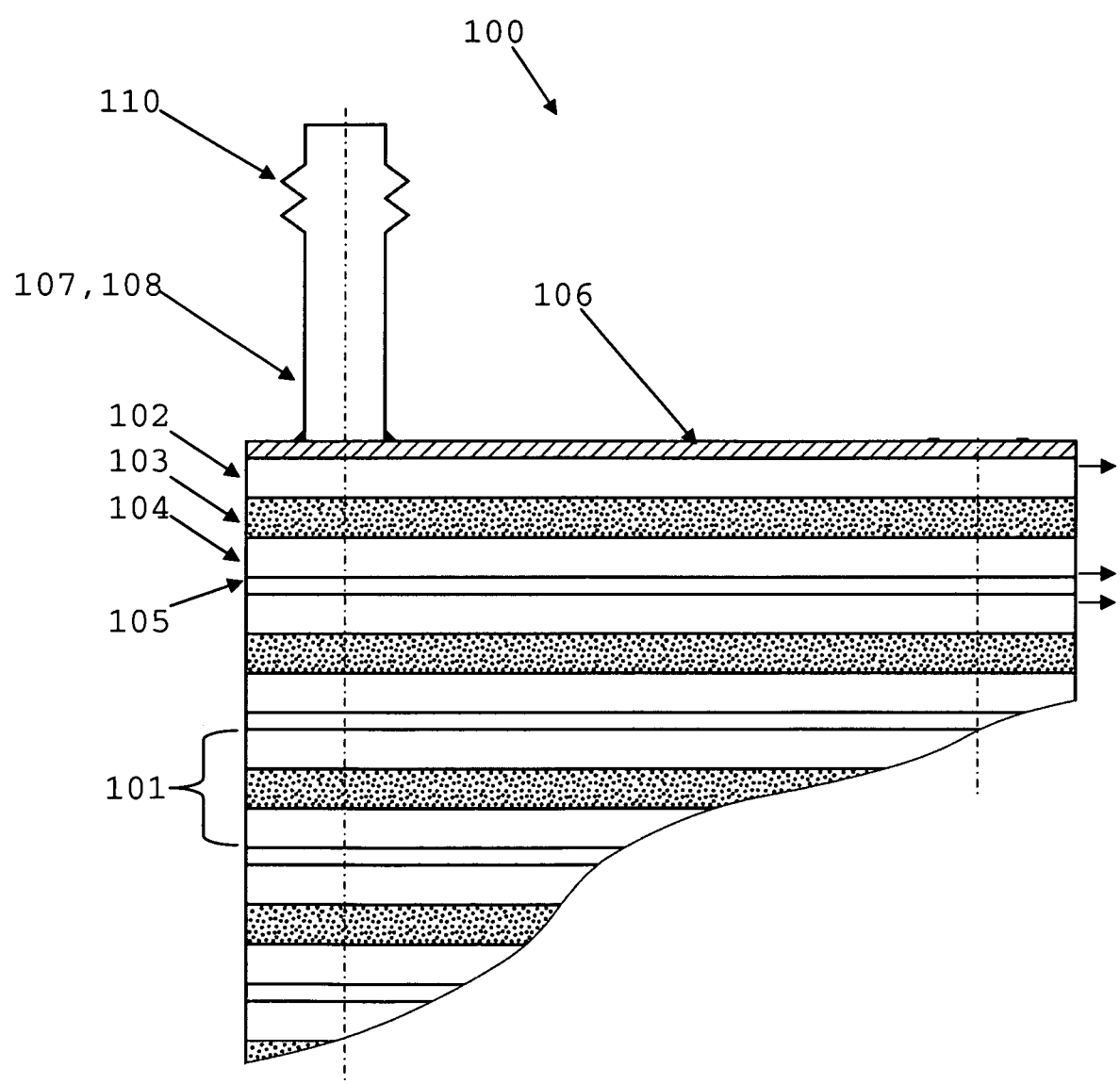
FIG. 2 shows a cut side view of an embodiment of the fuel cell stack without a second process gas distribution tube.

In another embodiment according to FIG. 2, the process-gas-distribution-endplate is provided with one process gas distribution tube, an anode gas distribution tube, inlet 108, which provides anode gas flow to the fuel cells of the stack. There is no a second process gas distribution tube, outlet. In stead, the anode gas is exhausted after it has flown past the active area of the fuel cells, and when exhausted, it is mixed with the cathode outlet gas and combusted.

The invention claimed is:

1. A solid oxide fuel cell stack comprising a plurality of stacked solid oxide fuel cells, wherein the solid oxide fuel cell stack is subjected, during operation, to high temperatures of up to approximately 10001° C., causing temperature gradients in the stack and thus thermal expansion of components of the stack, each solid oxide fuel cell comprising at least an anode, an electrolyte and a cathode and neighboring fuel cells are divided each by an interconnect, said stack has a first length and a first width, and further comprises:

at least one rectangular process-gas-connection-endplate formed of a metal layer consisting of a chrome steel or a nickel ahoy and having a thickness in the range of 0.2-2.0 mm, wherein the anode, cathode, electrolyte, interconnect and endplate are dimensioned to each have the first length and first width, the metal material and thickness of said process-gas-connection-endplate providing said process-gas-connection-endpate with a temperature expansion coefficient substantially the same as the temperature expansion coefficient of said plurality of cells to prevent damage from thermomechanical stresses and cracks, and stack delamination, due to temperature changes of the fuel cell stack, and to lower the thermal mass of said stack;

said at least one process-gas-connection-endplate and said plurality of fuel cells are connected to each other by seals to form a single integrated unit, and said process-gas-connection-endplate comprises at least one process gas distribution tube having a flexible member to compensate for vibrations and movements due to temperature changes of the fuel cell stack and due to vibrations and movements of connected process gas equipment relative to the fuel cell stack, said process gas distribution tube having a first end fixedly connected to an outer first face of the process-gas-connection-endplate and a second end extending outwardly away from said outer first face, and process gas flow paths integrated in a second face of the process-gas-connection-endplate opposite the first face of the process-gas-connection-endplate, said second face of the process-gas-connection endplate being in direct contact with one of said anode or cathode of the fuel cell, and the integrated flow paths distribute a process gas from the first process gas distribution inlet tube evenly past an active area of said fuel cells and to a second process gas distribution outlet tube, whereby the process-gas-connection-endplate and said at least one process gas distribution tube are permanently fixedly connected to form an integrated unit and no seals are disposed between the process-gas-connection-endplate and the at least one process gas distribution tube.

2. A fuel cell stack according to claim 1, wherein said flexible process-gas-connection-endplate is provided with two flexible process gas distribution tubes: a first process gas distribution inlet tube, and a second process gas distribution outlet tube, for distribution of anode gas or cathode gas to and from the plurality of stacked fuel cells, each of said first inlet tube and said second outlet tube having a first end fixedly connected to said outer first face of the process-gas-connection-endplate and second end extending outwardly away from said outer first face.

3. A fuel cell stack according to claim 1, wherein said process-gas-connection-endplate is provided with one flexible process gas distribution tube: an anode gas distribution inlet tube, and wherein the anode gas is distributed from said anode gas distribution inlet tube, evenly past said active area of said plurality of fuel cells, and thereafter exhausted, mixed with the cathode outlet gas and combusted.

4. A fuel cell stack according to claim 1, wherein said at least one flexible process gas distribution tube comprises a member adapted to compensate for vibrations and movements.

5. A fuel cell stack according to claim 4, wherein said flexible member is a bellows.

6. A fuel cell stack according to claim 1, wherein said at least one flexible process gas distribution tube is welded or brazed to the process-gas-connection-endplate.

7. A fuel cell stack according to claim 1, wherein the length and width of said process-gas-connection-endplate and said plurality of fuel cells are within the range of 40-300 mm.

8. A fuel cell stack according to claim 1, wherein the thickness of said process-gas-connection-endplate is in the range 0.4-1.2 mm.

9. A fuel cell stack according to claim 1, wherein the length and width of said process-gas-connection-endplate and said plurality of fuel cells are within the range of 80-200 mm.

10. A fuel cell stack according to claim 1, wherein the interconnects are formed of the same material and have substantially the same thickness as the process-gas-connection-endplate.

* * * * *